(No Model.)

M. A. WALSH.
GLOVER TOWER.

No. 292,078. Patented Jan. 15, 1884.

Witnesses
Jno. B. Connolly
Wm. H. Powell

Inventor
Moses A. Walsh,
By Connolly Bros.,
Attorneys

UNITED STATES PATENT OFFICE.

MOSES A. WALSH, OF CAMDEN, NEW JERSEY.

GLOVER TOWER.

SPECIFICATION forming part of Letters Patent No. 292,078, dated January 15, 1884.

Application filed June 12, 1883. (No model.)

*To all whom it may concern:*

Be it known that I, MOSES A. WALSH, a citizen of the United States, residing at Camden, in the county of Camden and State of New Jersey, have invented certain new and useful Improvements in Glover Towers; and I do hereby declare the following to be a full, clear, and exact description of the invention, reference being had to the accompanying drawings, which form part of this specification, in which—

Figure 1:
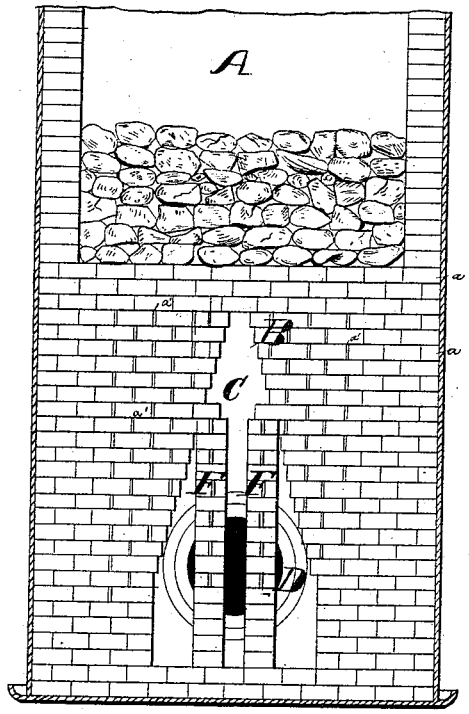
Figure 2:
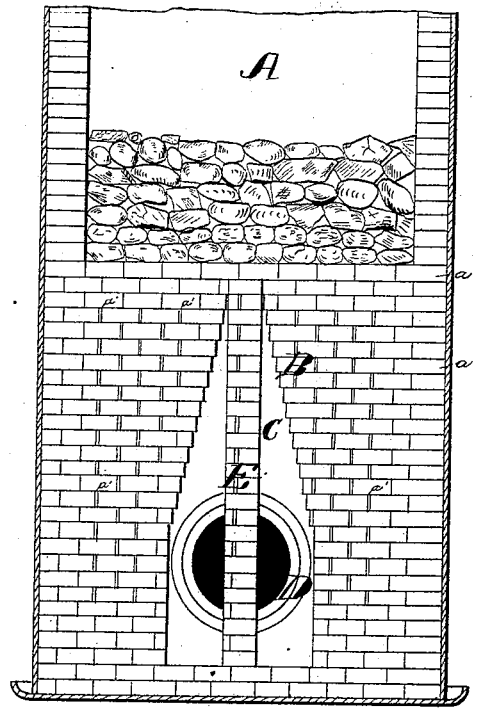
Figure 3:
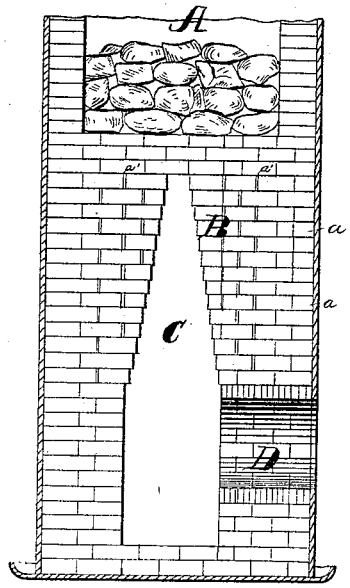

Figures 1, 2, and 3 are vertical sections of three towers embodying my improvements.

My invention relates to an improved construction of what is known as the "Glover tower" in the manufacture of sulphuric acid.

In making sulphuric acid the Glover tower is used to denitrate nitrous vitriol which has been formed in the Gay-Lussac tower, and at the same time to concentrate the acid to a specific gravity of 1.7 to 1.73 by means of the hot gases from the sulphur-burners. The efficiency of the tower both for denitrating and concentrating the acid is dependent on the completeness with which the acid is distributed in the tower, so as to be properly acted on by the burner-gases. In Glover towers as hitherto constructed the means of distributing the acid have been defective, inasmuch as the acid, which is well distributed in the upper portion of the tower by the flint or quartz pebbles with which such upper portion of the tower is filled, in a greater or less degree becomes collected together toward the bottom in drops and streamlets.

The object of my invention in one part is to remedy this defect.

My improvements in this connection consist in constructing a Glover tower with an arch the sides of which are corbeled out by overhanging courses.

Hitherto the flint or quartz with which the upper part of the Glover tower has been filled has been made to rest upon a circular arch, in which "pigeon-holes" were left for the gases which enter the tower under the arch to pass through. The descending acid collects into streamlets and drops in these pigeon-holes, and in this form is found to be more favorable for absorption of nitrous acid than it is for denitration by sulphurous acid, so that when "potting" is done in the sulphur-burners a loss of nitrous acid occurs through absorption by the sulphuric acid descending in streamlets and drops through the pigeon-holes in the circular arch. Instead, therefore, of constructing the tower with the perforated circular arch above described; or in any other manner which will cause the acid to form drops or streamlets when it gets near the bottom of the tower, I construct it with an arch of open brick-work in such a way that the weight of the contents of the tower rests upon the bottom and forms a large chamber in the lower part of the tower for the gases from the sulphur-burners to diffuse in, the sides of the arch being corbeled out by overhanging courses, as shown.

Referring to the accompanying drawings, A designates a Glover tower, composed of courses of bricks $a\ a$, laid, in the usual manner of constructing Glover towers, so as to leave vertical passage-ways $a'$ between them for the descending acid and ascending gases. Instead, however, of forming the tower with a circular arch, as heretofore, I construct it with a corbeled arch, B, by laying the courses of bricks so that they will overlap one another on the walls of the chamber C, the sides of the arch thus resembling inverted stairways. To the chamber C the gases from the sulphur-burners are admitted through a pipe-opening, D. The chamber thus constructed is provided with a very great number of apertures, through which the gases ascend, and the descending acid can nowhere form a drop or streamlet. It must of necessity form an extremely thin and continuous film over the very extensive surface of the angular arch.

In Fig. 3 is shown a plain arch, or one unsupported except at its ends. Figs. 2 and 3 show the same arch adapted for the construction of large towers, where increased height necessary to secure equilibrium would be inconvenient.

In Fig. 2 the middle of the arch is supported by one brick column, E, extending from front to back of tower, and built in the same open way as the angular arch—that is, the bricks placed side by side have spaces left between them.

In Fig. 1, adapted to a still larger tower, there are two columns, F F, extending from the front to the back of the tower, supporting the center of the arch, built in the same manner as the one in Fig. 2.

The acid running from the Glover tower as ordinarily constructed is too dark in color to be used in making oil of vitriol, because of the impurities derived from the materials of which such tower is made, and thus a valuable aid to concentration is lost to this branch of manufacture.

To make the Glover tower produce colorless acid, so that it can be used for making oil of vitriol in the ordinary platinum or glass still in the usual way, I substitute for the artificial bricks heretofore used in its walls blocks or bricks cut from quartz. The quartz is to be cut into shapes suitable for forming the bottom, arch, and outer walls or lining of the tower, and the tower is built of these cut blocks of bricks of quartz in the same manner as with the usual materials.

Acid treated in the usual manner in a tower constructed of this material will be colorless and devoid of the impurities heretofore derived in the tower.

I am aware that quartz has been used as a filling, and hence do not claim the same for that purpose.

I am also aware that a Gothic or angular arch is not in itself new in the arts or sciences, so that I restrict my claim in that connection to a Glover tower having such an arch designed for the distribution of descending acid.

What I claim as my invention is as follows:

1. A tower formed with an arch the sides of which are corbeled out by overhanging courses of blocks or bricks, having passages between them for the descent of acid and ascent of gases, and having a lateral opening for the admission of such gases, substantially as and for the purpose specified.

2. A tower the walls and arch of which are composed of blocks of cut or shaped quartz, said tower having an upper chamber for the reception of acid and a lateral opening near its base for the introduction of gases, substantially as and for the purposes set forth.

3. A Glover tower the walls and arch of which are composed of courses of cut quartz, said arch being corbeled out by overhanging arches, and formed with openings for the descent of acid from an upper chamber and the ascent of gases admitted through a lateral opening near the base of the tower, substantially as shown and described.

4. A Glover tower having an arch with supporting column or columns, said arch having its sides corbeled out by overhanging courses, substantially as shown and described.

In testimony that I claim the foregoing I have hereunto set my hand this 8th day of June, 1883.

MOSES A. WALSH.

Witnesses:
 ANDREW ZANE, Jr.,
 WM. H. POWELL.